(12) United States Patent
Takahashi et al.

(10) Patent No.: US 7,899,651 B2
(45) Date of Patent: Mar. 1, 2011

(54) ENTRANCE ANGLE ESTIMATION METHOD OF V-RIBBED BELT, ENTRANCE ANGLE ESTIMATION PROGRAM EMPLOYING THE METHOD, AND PULLEY LAYOUT DESIGNING METHOD

(75) Inventors: Hiroyoshi Takahashi, Kobe (JP); Eijiro Nakashima, Kobe (JP); Hideaki Kawahara, Kobe (JP)

(73) Assignee: Bando Chemical Industries, Ltd., Kobe-Shi, Hyogo (JP)

( * ) Notice: Subject to any disclaimer, the term of this patent is extended or adjusted under 35 U.S.C. 154(b) by 701 days.

(21) Appl. No.: 11/576,463

(22) PCT Filed: Oct. 7, 2005

(86) PCT No.: PCT/JP2005/018663
§ 371 (c)(1),
(2), (4) Date: Mar. 30, 2007

(87) PCT Pub. No.: WO2006/041043
PCT Pub. Date: Apr. 20, 2006

(65) Prior Publication Data
US 2008/0064549 A1 Mar. 13, 2008

(30) Foreign Application Priority Data
Oct. 15, 2004 (JP) .............................. 2004-302132

(51) Int. Cl.
*G06F 17/50* (2006.01)
(52) U.S. Cl. .......................... 703/1; 474/134; 474/263; 474/49; 474/8; 474/70; 464/32; 451/81; 451/297; 703/6; 703/7; 703/8
(58) Field of Classification Search ................. 474/263, 474/101; 345/473
See application file for complete search history.

(56) References Cited
U.S. PATENT DOCUMENTS
5,835,693 A * 11/1998 Lynch et al. ................ 345/473
(Continued)

FOREIGN PATENT DOCUMENTS
JP 4-88754 U 7/1992
(Continued)

OTHER PUBLICATIONS
Translation of JP 2002-041586.*
(Continued)

*Primary Examiner* — Kamini S Shah
*Assistant Examiner* — Cuong V Luu
(74) *Attorney, Agent, or Firm* — Roberts Mlotkowski; Safran & Cole P.C.

(57) ABSTRACT

In a method for estimating an entrance angle of a V-ribbed belt from a flat pulley to a V-ribbed pulley, the entrance angle is estimated easily at a stage of pulley layout design.

The V-ribbed belt 10 forms a track which enters at an entrance angle of approximately zero degree (substantially perpendicular to a plane that includes an axis 3a of rotation) into the flat pulley 3, is wound along the outer peripheral face of the flat pulley 3 without deviating in the axial direction thereof, and extends substantially linearly from a winding end point c at the flat pulley 3 to a winding start point d at a drive pulley 1. The entrance angle α of the V-ribbed belt 10 from the flat pulley 3 to the drive pulley 1 is obtained on the basis of the track of the V-ribbed belt by, for example, a three-dimensional CAD or the like.

5 Claims, 8 Drawing Sheets

U.S. PATENT DOCUMENTS

2001/0024985 A1* 9/2001 Kurose ............... 474/101
2005/0003918 A1* 1/2005 Hayashi ............... 474/263

FOREIGN PATENT DOCUMENTS

| JP | 2001-343054 A | 12/2001 |
| JP | 2002-41586 A | 2/2002 |
| JP | 2002-349649 A | 12/2002 |

OTHER PUBLICATIONS

Translation of JP 2002-349649.*
English International Search Report mailed Jan. 10, 2006, 2 pages.

* cited by examiner (a)

ENTRANCE ANGLE ESTIMATION METHOD OF V-RIBBED BELT, ENTRANCE ANGLE ESTIMATION PROGRAM EMPLOYING THE METHOD, AND PULLEY LAYOUT DESIGNING METHOD

TECHNICAL FIELD

The present invention relates to a method for estimating an entrance angle of a belt to a V-ribbed pulley in a power transmission device using the V-ribbed belt, and the like.

BACKGROUND ART

As one of driving devices for driving an auxiliary machine of an automobile, a belt type auxiliary machine driving device (belt transmission device) has been conventionally known which transmits engine's rotation to the auxiliary machine through a belt. A V-ribbed belt is used in general as the transmission belt in view of the transmission power, lifetime, and the like. In the V-ribbed belt, a plurality of ribs extending in the longitudinal direction of the belt are formed so as to be arranged in the widthwise direction of the belt at a predetermined pitch on the lower face (the inner peripheral face) of the belt body. Core wires are embedded in the belt body at a predetermined pitch in the widthwise direction of the belt.

In belt-type auxiliary machine driving devices using such a V-ribbed belt, in general, pulleys to which the V-ribbed belt is wound includes misalignment, such as offset, slant, and the like, and strictly, the belt would approach and enter into a pulley with inclination, as shown in FIG. 11, for example. When the entrance angle of the belt to a V-ribbed pulley is large, noise is liable to be generated due to slip of the ribbed surface of the belt over the groove face of the pulley in belt running.

To tackling this problem, in the drive system composed of V-ribbed pulleys as shown in FIG. 11, the entrance angle of the V-ribbed belt is calculated geometrically from maximum misalignment (a offset amount, a slant angle, and the like) of the pulleys at the stage of pulley layout design to check whether the calculated entrance angle is an angle at which the belt generates noise in belt running, and the positions of the pulleys are modified if necessary.

Besides the above method in which the entrance angle is obtained and the layout is modified in advance at the design stage, another method for preventing noise generated due to pulley misalignment has been known, as disclosed in Patent Document 1, for example. Namely, the side pressure is measured by a strain gauge arranged at the side face of the groove of a pulley to detect pulley misalignment and the arrangement of the pulleys is corrected on the basis of the detect misalignment.

Patent Document 1: Japanese Patent Application Laid Open Publication No. 2002-349649A

SUMMARY OF THE INVENTION

Problems that the Invention is to Solve

In general, in an actual auxiliary machine drive system for an automobile, the back face of a belt on which no ribs are formed is wound to a flat pulley, which changes the track of the V-ribbed belt. Therefore, geometrical specification of the entrance angle of the belt as described above cannot be attained only from the arrangement of the V-ribbed pulley, and it is necessary to measure actually the entrance angle in every pulley layout.

This prevents prediction of noise generation at the stage of pulley layout design, resulting in insufficient examination of pulley layout that generates no noise.

The present invention has been made in view of the foregoing and has its object of, in a method for estimating an entrance angle of a V-ribbed belt from a flat pulley to a V-ribbed pulley, enabling easy estimation of the entrance angle at the stage of pulley layout design by focusing attention on a track of the V-ribbed belt with respect to the flat pulley.

Means of Solving the Problems

To attain the above object, an entrance angle estimation method according to the present invention enable geometrical estimation of an entrance angle of a belt from a flat pulley to a V-ribbed pulley on the basis of the relationship between the flat pulley and a track of the V-ribbed belt which has been found by the inventors' diligent and hardworking study.

Specifically, an invention in Claim 1 is directed to an entrance angle estimation method of a V-ribbed belt from a flat pulley to a V-ribbed pulley for a belt transmission device in which the V-ribbed belt is wound to at least two V-ribbed pulleys and at least one flat pulley arranged between the V-ribbed pulleys when at least one of the three pulleys includes misalignment.

Wherein, a track of the V-ribbed belt is obtained on the assumption that the V-ribbed belt forms a track: which enters linearly at an entrance angle of approximately zero degree into the flat pulley from one of the pulleys which is located on the entry side of the flat pulley; which is wound on the outer peripheral face of the flat pulley without deviating in the widthwise direction thereof; and which travels linearly to the other pulley on the exit side of the flat pulley from the flat pulley, and an entrance angle of a belt from the flat pulley to the V-ribbed pulley is obtained on the basis of the track of the V-ribbed belt.

According to the above method, even if, for example, the axis of rotation of the flat pulley is displaced relative to an adjacent pulley due to pulley misalignment, the track of the V-ribbed belt can be specified geometrically with influence of the displacement taken into consideration. Hence, the entrance angle of the belt from the flat pulley to the V-ribbed pulley can be obtained easily with the need for actual measurement eliminated.

In the above arrangement, when a belt span between the flat pulley and the V-ribbed pulley located on the belt entry side thereof is equal to or smaller than a predetermined value, it is preferable to correct the entrance angle of the V-ribbed belt to the flat pulley so as to be larger than zero degree (Claim 2).

When the belt span between the flat pulley and the V-ribbed pulley located on the belt entry side thereof becomes equal to or smaller than the predetermined value, the engagement of the grooves of the V-ribbed pulley and the ribs of the V-ribbed belt exerts influence so that the tension of the V-ribbed belt increases to be larger than the frictional force thereof against the outer peripheral face of the flat pulley. As a result, the V-ribbed belt slips sideways over the outer peripheral face of the flat pulley and enters into the flat pulley while forming a track approximated to the straight line that connects the winding end point and the winding start point at the two V-ribbed pulleys. In this case, when the entrance angle of the V-ribbed belt to the flat pulley is corrected as described above, the calculated track can be approximated to the actual track of the V-ribbed belt, and the entrance angle of the belt to the V-ribbed pulley can be calculated easily. The belt span equal to or smaller than the predetermined value means a belt span with which the V-ribbed belt slips sideways over the outer peripheral face of the flat pulley.

Further, estimation of the entrance angle, which can be performed easily, can be utilized to pulley layout design. Specifically, inventions of Claims 3 and 4 of the present application is pulley layout designing methods which includes the steps of: an entrance angle estimation step of estimating an entrance angle of a belt from a flat pulley to a V-ribbed pulley by the entrance angle estimation method of Claim 1 or 2; and a layout changing step of changing, when the entrance angle estimated in the entrance angle estimation step is larger than a predetermined angle, pulley layout so as to increase a belt span between the V-ribbed pulley and the flat pulley and/or so as to reduce a belt span between the flat pulley and the V-ribbed pulley located on the belt entry side thereof.

With the above arrangement, when the entrance angle of the belt to the V-ribbed pulley estimated by the aforementioned entrance angle estimation method becomes equal to or lager than the predetermined angle, at least one of the V-ribbed pulleys and the flat pulley is shifted to increase the belt span between the V-ribbed pulley and the flat pulley on the belt entry side thereof or to reduce the belt span between the flat pulley and the V-ribbed pulley on the belt exit side thereof, so that the entrance angle can be reduced to be equal to or smaller than the predetermined angle. The predetermined angle means an entrance angle at which no noise is generated in belt running and is set in the range between approximately 0.5 and 1.0 degree in general.

Hence, when the entrance angle is made to be equal to or smaller than the predetermined angle by shifting at least one of the V-ribbed pulleys and the flat pulley, the pulley layout can be attained which prevents noise generation in belt running.

An invention according to Claim 5 of the present application is directed to a computer program for a belt transmission device in which a V-ribbed belt is wound to at least two V-ribbed pulleys and at least one flat pulley arranged between the V-ribbed pulleys, which is for obtaining an entrance angle of the V-ribbed belt from the flat pulley to a V-ribbed pulley.

Wherein, the above program includes the steps of: a pulley model creating step of creating in virtual three-dimensional space pulley models simulating at least parts of contact faces of the pulleys which are in contact with the belt; a belt track calculation step of calculating a track of the V-ribbed belt in the virtual three-dimensional space with the use of the pulley models created in the pulley model creating step on the assumption that the V-ribbed belt enters to the flat pulley at an entrance angle of approximately zero degree, is wound on the outer peripheral face of the flat pulley, and travels in the peripheral direction thereof without deviating in the widthwise direction thereof; and an entrance angle calculation step of obtaining an entrance angle of the belt from the flat pulley to the V-ribbed belt on the basis of the track of the V-ribbed belt calculated in the belt track calculation step.

More specifically, in the above computer program, in the belt track calculation step, a track of the V-ribbed belt between adjacent two pulleys is expressed as a segment in contact with the outer peripheral faces of pulley models corresponding to the two pulleys; a track in a belt span between the flat pulley and an entry side V-ribbed pulley located on the belt entry side of the flat pulley is calculated as a segment which passes a predetermined point in the widthwise direction on the outer peripheral face of the V-ribbed pulley model and which intersects at a right angle with a segment parallel to an axis of rotation of the flat pulley on the outer peripheral face of the flat pulley; a track of the V-ribbed belt wound to and traveling on the flat pulley is calculated as an arc extending in the peripheral direction on the outer peripheral face of the flat pulley model without deviating in the widthwise direction thereof; and a track in a belt span between the flat pulley and an exit side V-ribbed pulley located on the belt exit side of the flat pulley is calculated as a segment that connects an end point of the belt track calculated as an arc and a predetermined point on the outer peripheral face of the exit side V-ribbed pulley model which corresponds to the predetermined point in the widthwise direction on the outer peripheral face of the entry side V-ribbed pulley model (Claim 6). Wherein, the predetermined point in the widthwise direction means a winding point in the widthwise direction of the V-ribbed belt on the V-ribbed pulley and is set to the center in the widthwise direction, for example.

Execution of the above computer program by a computer attains a three-dimensionally expressed entrance angle of the belt to the V-ribbed pulley, which means that the entrance angle can be obtained easily without performing complicated calculation on paper, leading to easy optimum layout design that takes the entrance angle into consideration.

In the above computer program, in the belt track calculation step, the track in a belt span between the flat pulley and another flat pulley located on the belt exit side of the flat pulley is calculated as a segment which passes an end point of the belt track on the outer peripheral face of the flat pulley model relatively located on the belt entry side thereof and intersects at a right angle with an axis of rotation of the other flat pulley model relatively located on the belt exit side thereof on the outer peripheral face thereof (Claim 7).

With the above arrangement, even when a plurality of flat pulleys are arranged in series, the track of the V-ribbed belt wound therearound can be specified.

EFFECTS OF THE INVENTION

As described above, it was found that V-ribbed belt forms a track which enters at an entrance angle of approximately zero degree into the flat pulley from the pulley on the entry side thereof, which is wound along the outer peripheral face of the flat pulley, and which extends substantially linearly toward the pulley located on the exit side thereof. With the findings, in the entrance angle estimation method according to the present invention, the entrance angle of the V-ribbed belt from the flat pulley to the V-ribbed pulley is calculated geometrically on the basis of the track of the V-ribbed belt. Hence, layout that causes no noise in belt running can be examined at the stage of pulley layout design, leading to prevention of noise generation.

Further, when the above entrance angle estimation method is performed by allowing a computer to execute the entrance angle estimation program of the present invention, the entrance angle of the belt to the V-ribbed pulley can be obtained with ease.

BRIEF DESCRIPTION OF THE DRAWINGS

FIG. 11 presents top views of a drive system composed of V-ribbed pulleys, wherein FIG. 11(a) shows a state that the V-ribbed pulleys are offset, and FIG. 11(b) shows a state that a V-ribbed pulley is inclined.

EXPLANATION OF REFERENCE NUMERALS

T drive system
a winding end point at driven pulley
b winding start point at flat pulley
c winding end point at flat pulley (end point of belt track)
d winding start point at drive pulley
α entrance angle of belt to drive pulley
1 drive pulley (V-ribbed pulley)
2 driven pulley (V-ribbed pulley)
3 flat pulley
3a axis of rotation
10 V-ribbed belt
10a belt center line

BEST MODE FOR CARRYING OUT THE INVENTION

Hereinafter, one embodiment of the present invention will be described with reference to the accompanying drawings. It should be noted that the following description of the preferred embodiment is a mere example essentially and is not intended to limit the present invention, applicable subjects thereof, and usage thereof.

Figure 1:
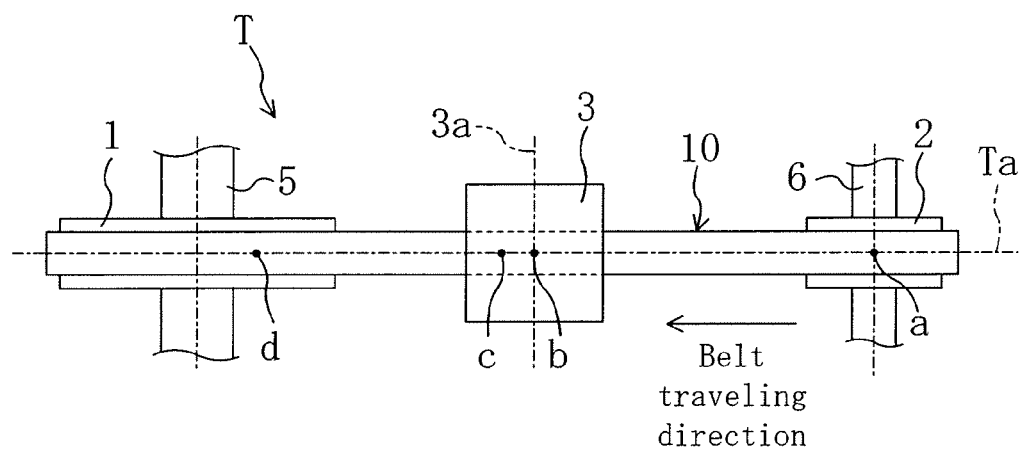
FIG. 1 shows a schematic construction of a drive system according to one embodiment of the present invention, wherein FIG. 1(*a*) is a top view when viewed in a direction intersected at a right angle of the traveling direction of a V-ribbed belt, and FIG. 1(*b*) is a front view.
Figure 1:
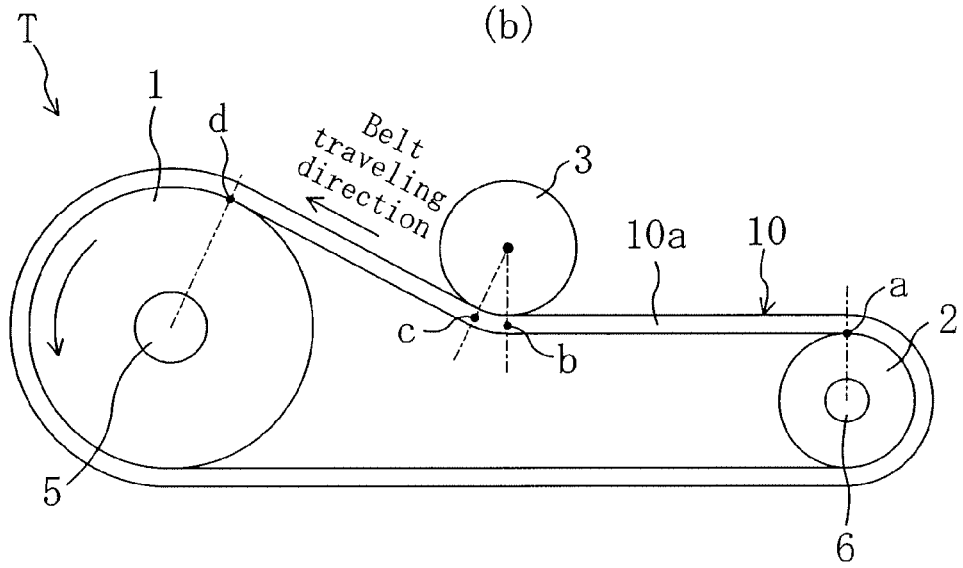

FIG. 1 shows a power transmission belt drive system T (belt drive power transmission) according to the embodiment of the present invention. The power transmission belt drive system T includes V-ribbed pulleys 1, 2 of a drive pulley and a driven pulley, and a flat pulley 3 arranged between the V-ribbed pulleys 1, 2, and a V-ribbed belt 10 as a power transmission belt, on the inner peripheral face of which a plurality of ribs extending in the longitudinal direction of the belt are formed, is wound to each of the pulleys 1, 2, 3.

The drive pulley 1 is mounted integrally rotatably to a drive shaft 5 so as to be rotated anticlockwise in FIG. 1(b) by the drive shaft 5. On the other hand, the driven pulley 2 is mounted integrally rotatably to an input shaft 6 so as to transmit to the input shaft 6 power transmitted from the drive pulley 1 through the V-ribbed belt 10.

A plurality of grooves (not shown) are formed in each outer peripheral face of the drive pulley 1 and the driven pulley 2 so as to extend in the peripheral direction thereof. The side faces of the plurality of ribs formed on the inner peripheral face of the V-ribbed belt 10 are in contact with the faces of the grooves.

The flat pulley 3 has a flat outer peripheral face. In a state that the outer peripheral face thereof is engaged with the outer peripheral face (back face) of the V-ribbed belt 10 which has no ribs, the flat pulley 3 pushes, for adjusting the tension of the belt 10, a span 10a of the V-ribbed belt 10 that travels anti-clockwise as shown in FIG. 1(b), which is a part of the V-ribbed belt 10 on the entry side of the drive pulley 1.

In the above arrangement, when the flat pulley 3 is inclined relatively, the entrance angle of the belt to the drive pulley 1 becomes large to cause the rib side face of the V-ribbed belt 10 to slip over the groove face of the drive pulley 1, leading to noise generation in belt running. In order to suppress the noise generation, it is necessary to predict an entrance angle by examining the layout of the pulleys 1, 2, 3 at which no noise is generated at the stage of pulley layout design. In the above arrangement, in which the track of the V-ribbed belt 10 is changed by the flat pulley 3, however, the entrance angle cannot be specified geometrically only from the arrangement of the V-ribbed pulleys 1, 2, and actual measurement of the entrance angle is required in every pulley layout.

To tackling this problem, the present inventors have studied to find that the V-ribbed belt 10 forms the following track under a state that the flat pulley 3 is inclined relatively. Wherein, though the flat pulley 3 would be inclined three-dimensionally, the following description limits for the sake of simplification the inclination to a state where the axis 3a of rotation of the flat pulley 3 is inclined only in the clockwise direction when viewed from above as shown in FIG. 2, and the track of the V-ribbed belt 10 under the state will be described.

Figure 2:
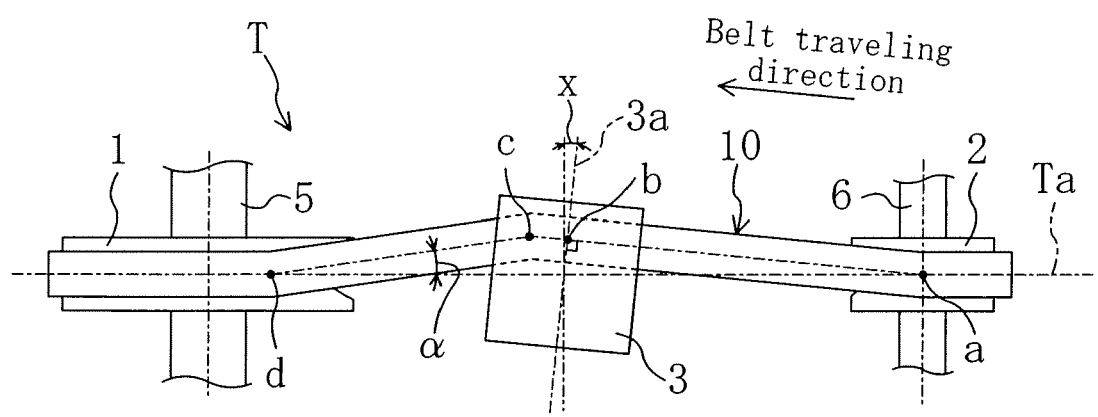
FIG. 2 is a view corresponding to FIG. 1(*a*) and shows a state that a flat pulley is inclined.

In the state that the flat pulley 3 is inclined as shown in FIG. 2, the V-ribbed belt 10 is to be wound to the flat pulley 3 along the outer periphery thereof in the peripheral direction thereof, starting at a predetermined point in the axial direction of the flat pulley 3 (the widthwise direction in FIG. 2) in the presence of friction against the outer peripheral face of the flat pulley 3. Accordingly, the V-ribbed belt 10 forms a track: which enters at an entrance angle of zero degree into the flat pulley 3, namely, enters substantially perpendicularly to a plane that includes the axis 3a of rotation and a winding start point b at the flat pulley 3; which is wound along the outer periphery of the flat pulley 3 without deviating in the axial direction (the widthwise direction) thereof; and which extends so that the center line that connects the centers in the widthwise direction of the V-ribbed belt 10 (hereinafter referred to as a belt center line) becomes substantially linear from a winding end point c at the flat pulley 3 toward a winding start point d at the drive pulley 1.

When the above behavior of the V-ribbed belt 10 is taken into consideration, the track thereof can be specified geometrically, enabling calculation of the entrance angle α of the belt to the drive pulley 1 to enable pulley layout that generates no noise to be examined at the design stage. A method for estimating the entrance angle α will be described below in detail.

—Method for Estimating Entrance Angle—

Figure 3:
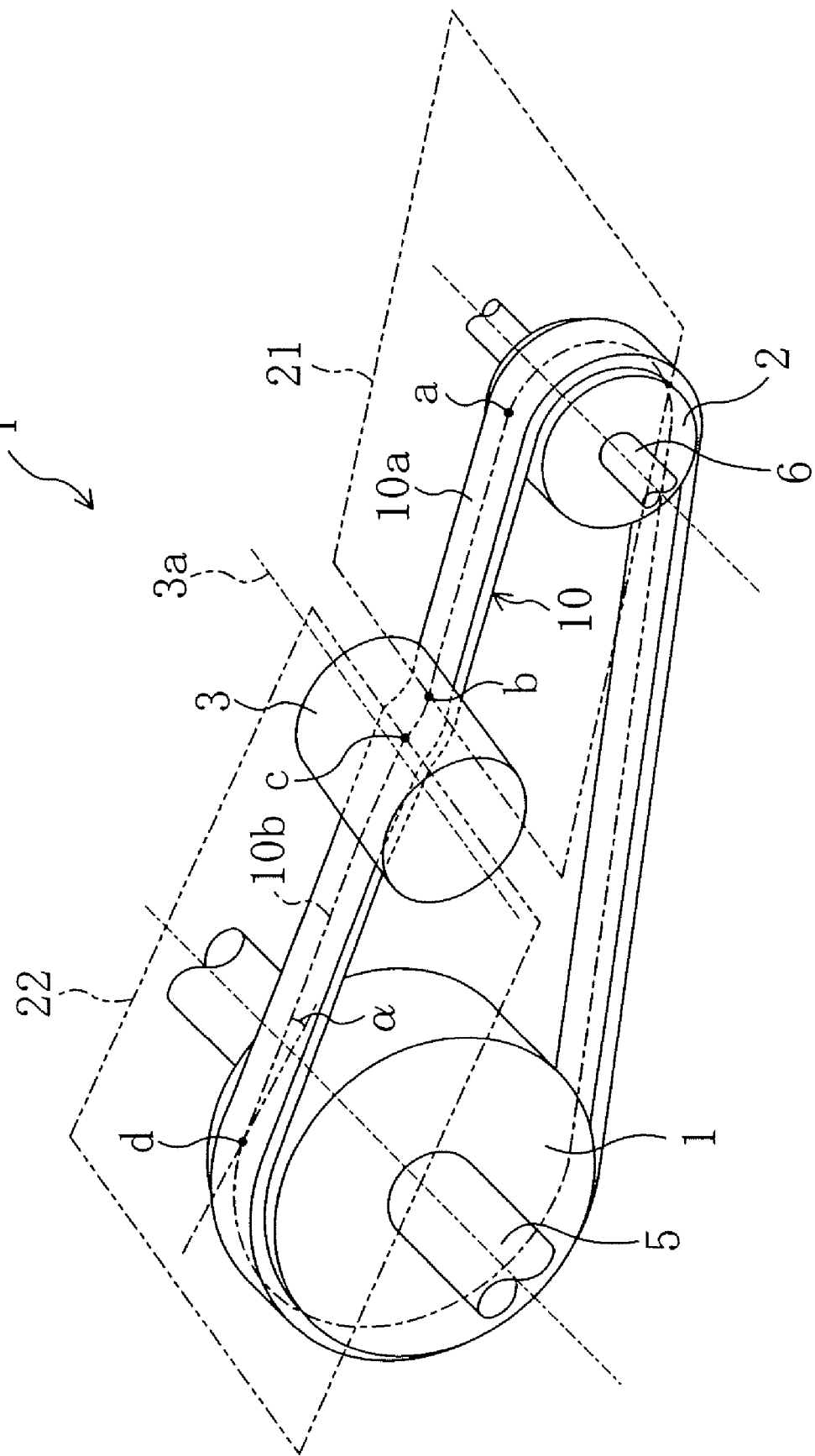
FIG. 3 is an illustration showing three-dimensional models in a three-dimensional CAD.

The entrance angle α can be calculated with the use of, for example, an expression or the like, but is desirable to be calculated through a computer program for a three-dimensional CAD or the like in a computer in view of design efficiency. As one example of the methods for estimating an entrance angle α, an estimation method using a program for a three-dimensional CAD will be described with reference to FIG. 3.

First, in the three-dimensional CAD operating on a computer, column-shaped models (pulley models) of the driven pulley 1, the driven pulley 2, and the flat pulley 3 are created in virtual three-dimensional space. Then, the V-ribbed belt 10 is modeled so that the inner periphery thereof is engaged with the outer peripheral faces of the pulley models of the drive pulley 1 and the driven pulley 2 while the outer periphery thereof is engaged with the outer peripheral face of the flat pulley 3.

In modeling, the V-ribbed belt 10 is wound to the pulley models 1, 2, 3 so that the belt center line 10b forms a track which enters at an entrance angle of approximately zero degree into the flat pulley 3 from a winding end point a at the driven pulley 2, namely, substantially perpendicularly to a plane that includes the axis 3a of rotation of the flat pulley 3 and the winding start point b at the flat pulley 3; which is wound in the peripheral direction of the flat pulley 3 along the outer periphery thereof; and which extends substantially linearly from the winding end point c at the flat pulley 3 to the winding start point d at the drive pulley 1.

Modeling of the V-ribbed belt 10 will be described below further in detail.

First, a segment or an arc is drawn in the three-dimensional space as a track of the center line 10b in the widthwise direction of the V-ribbed belt 10. The V-ribbed belt 10 passes on a first contact plane 21 in contact with each outer peripheral face of the driven pulley 2 and the flat pulley 3 and a second contact plane 22 in contact with each outer peripheral face of the flat pulley 3 and the drive pulley 1, and accordingly, the belt center line 10b is drawn so as to be located on the two contact planes 21, 22.

Specifically, the belt center line 10b is drawn from the belt winding end point a located on the first contact plane 21 and at the center in the axial direction on the outer peripherally face of the driven pulley 2 (a predetermined point in the widthwise direction) so as to intersect at a right angle with the nodal line (a segment parallel to the axis 3a of rotation) of the first contact plane 21 and the outer peripheral face of the flat pulley 3. The intersection of the belt center line 10b and the nodal line serves as the winding start point b.

Then, the belt center line 10b is drawn in an arc shape from the winding start point b to the nodal line of the second contact plane 22 and the outer peripheral face of the flat pulley 3 so as to be along the outer periphery of the flat pulley 3 without deviating in the axial direction thereof, and then is drawn linearly from the belt winding end point c located on the nodal line of the second contact plane 22 and the outer peripheral face of the flat pulley 3 to the belt winding start point d located on the second contact plane 22 and at the center in the axial direction on the outer peripheral face of the drive pulley 1 (a predetermined point in the widthwise direction).

Further, the belt center line 10b is drawn on the outer peripheral faces of the drive pulley 1 and the driven pulley 2 along each center in the axial direction thereof and is drawn linearly between a winding end point at the drive pulley 1 and a winding start point at the driven pulley 2 which are located on a contact plane in contact with the outer peripheral faces of the drive pulley 1 and the driven pulley 2. The thus drawn belt center line 10b expresses the track of the V-ribbed belt 10.

It is noted that the aforementioned step of creating models of the pulleys 1, 2, 3 corresponds to a pulley model creating step while the step of drawing the track of the V-ribbed belt 10 wound to the pulleys 1, 2, 3 corresponds to a belt track calculation step.

Entireties of the drive pulley 1 and the driven pulley 2 may not necessarily be modeled. Only parts of the outer peripheral faces (faces in contact with the belt 10) including the vicinity of the belt winding end point a or the vicinity of the winding start point d may be modeled so that the track of the belt 10 between them and the flat pulley 3 can be obtained.

When the track of the V-ribbed belt 10 is specified as above, a three-dimensional CAD can calculate the entrance angle α of the V-ribbed belt 10 to the drive pulley 1. This step of obtaining the entrance angle α corresponds to an entrance angle calculation step. In this way, the entrance angle α of the belt to the drive pulley 1 can be obtained by calculation at the design stage, leading to efficient design of layout that generates no noise in belt running. The entrance angle α implies an inclination of the center line 10b of the belt 10 with respect to the plane which intersects at a right angle with the axis of rotation of the drive pulley 1 and which includes the winding start point d.

Next, calculation accuracy of the entrance angle estimation method for calculating the entrance angle α is proved on the assumption that the belt 10 runs along the track as above. In order to prove the calculation accuracy, the entrance angles α were measured with the use of a test machine in which pulleys are layouted the same as the models in the three-dimensional CAD, and the entrance angles α (hereinafter denoted by $α_a$) were obtained by FEM analysis using the three-dimensional models simulating the test condition. The results are shown in FIG. 4 and FIG. 5

Figure 4:
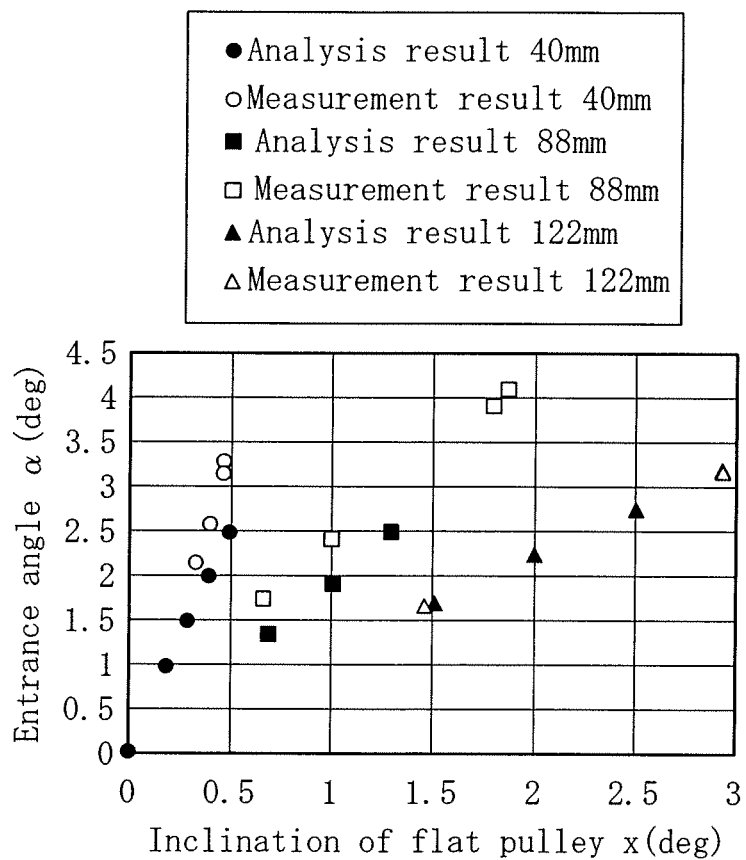
FIG. 4 is a graph showing a comparison between analysis results by FEM analysis and actual measurement values of entrance angles when the inclined angle of the flat pulley is changed.

FIG. 4 shows results (solid marks in the drawing) of the entrance angles $α_a$ obtained by the FEM analysis and actual measurement results (outline marks in the drawing) of the entrance angle α under the condition that the inclination of the flat pulley 3 and the span on the entry side of the drive pulley 1, namely, the distance between the winding end point c at the flat pulley 3 and the winding start point d at the drive pulley 1 are changed (40, 88, and 122 mm). The results show that the entrance angle $α_a$ obtained by the FEM analysis approximately agree with the entrance angle α actually measured with the use of the test machine in every changed span, which means that the FEM analysis provides high calculation accuracy. The results (the analysis results and the measurement results) in FIG. 4 were obtained in the test machine using the drive pulley 1 and the driven pulley 2 each having a diameter of 145 mm, the flat pulley 3 having a diameter of 70 mm, and the belt 10 having a length of 1200 mm.

Figure 5:
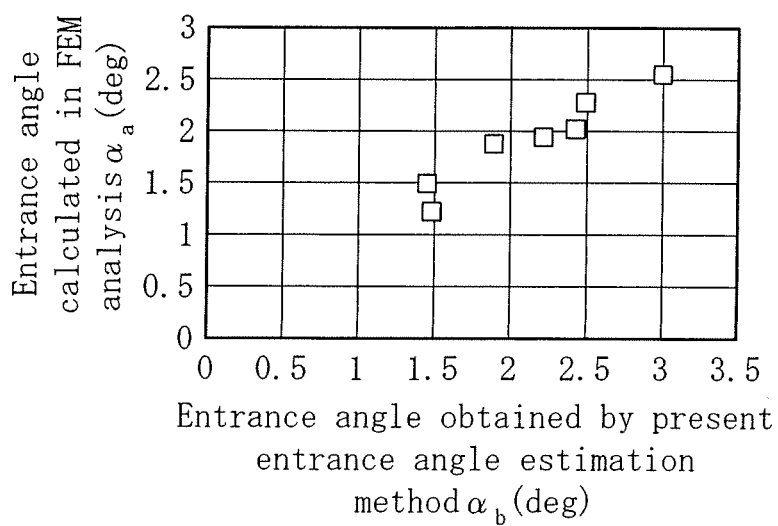
FIG. 5 is a graph showing the relationship between the analysis results of the entrance angle by the FEM analysis and results of calculation of an expression using two-dimensional models.

Referring to FIG. 5, the entrance angles $α_a$ obtained by the FEM analysis approximately agree with the entrance angle α (hereinafter denoted by $α_b$) calculated by the above described entrance angle estimation method. When the results in FIG. 4 are taken into consideration, it is understood that the track of the V-ribbed belt 10 is approximated to the aforementioned track that the inventors have found. The entrance angles $α_a$, $α_b$ in FIG. 5 are calculation results in the test machine using the drive pulley 1 and the driven pulley 2 each having a diameter of 145 mm, the flat pulley 3 having a diameter of 70 mm, and the belt 10 having a length of 1200 mm under the condition that the inclination of the flat pulley 3 and the belt span (the reference dimension is 40 mm) between the flat pulley 3 and the drive pulley 1 are changed with 980 N load applied to the driven pulley 2 for causing the tension to work on the belt 10.

Description will be given next to a method for correcting the entrance angle of the belt to the flat pulley 3 when the belt span L1 between the flat pulley 3 and the driven pulley 2 is equal to or smaller than a predetermined value. Though the entrance angle of the belt to the flat pulley 3 is corrected on the basis of the two-dimensional models when viewing the drive system T from above as shown in FIG. 6 and FIG. 7 for the sake of simile description in the following description, it is in fact preferable that the entrance angle of the belt to the flat pulley 3 is corrected on the basis of three-dimensional models in, for example, a three-dimensional CAD or the like.

Figure 6:
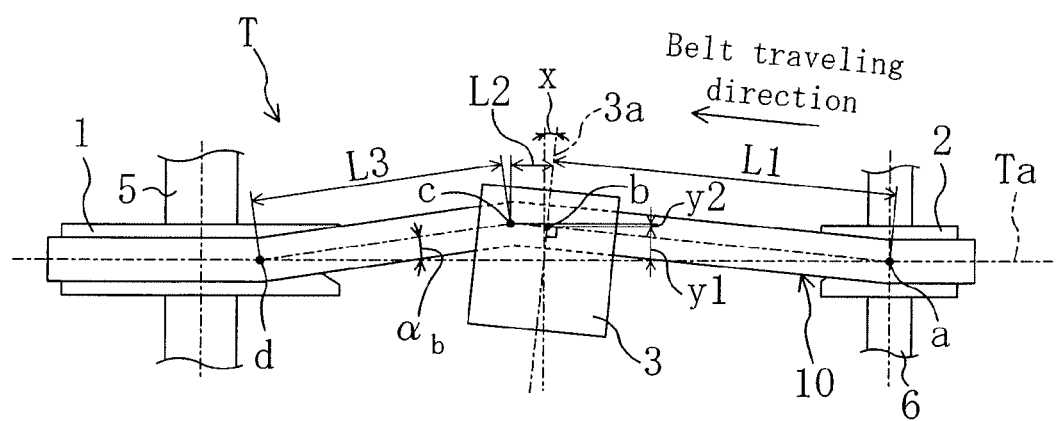
FIG. 6 is a top view illustrating a calculation condition in calculation of the expression using the two-dimensional models.
Figure 7:
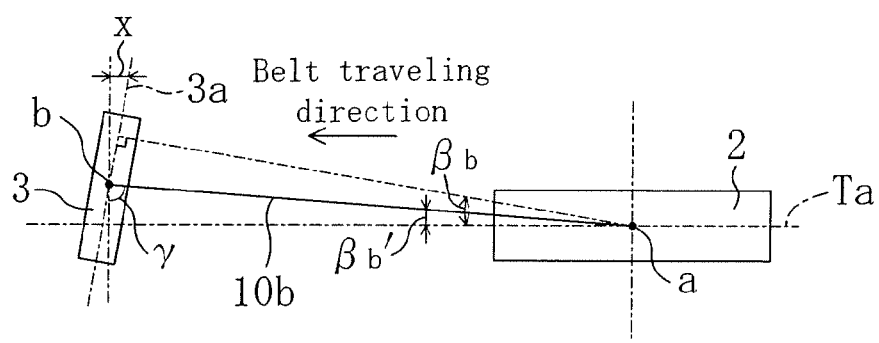
FIG. 7 is an enlarged schematic view partially showing a drive pulley and the flat pulley in the two-dimensional model.

When taking only the center line in the widthwise direction of the V-ribbed belt 10 into consideration when viewing the drive system T from above as shown in FIG. 6, a displacement y1 of the winding start point b at the flat pulley 3 from the straight line $T_a$ that connects the winding start point d at the drive pulley 1 and the winding end point a at the driven pulley 2 and a displacement y2 of the winding end point c from the starting point b at the flat pulley 3 are expressed by the following expressions:

$$y1 = L1*\tan(\beta_b \pi/180) \quad (1)$$

$$y2 = L2*\tan(\beta_b \pi/180) \quad (2),$$

wherein $\beta_b$ is an exit angle of the V-ribbed belt 10 from the driven pulley 2 (equal to an inclination x of the axis 3a of rotation of the flat pulley 3 in the present embodiment), L1 is a belt span between the driven pulley 2 and the flat pulley 3 (a distance between the winding end point a and the winding start point b), and L2 is a winding length of the V-ribbed belt 10 along the outer peripheral face of the flat pulley 3. The entrance angle $\alpha_b$ of the V-ribbed belt 10 to the drive pulley 1 can be obtained by the following expression using the displacements y1 and y2:

$$\alpha_b = \tan^{-1}((y1+y2)/L1)*180/\pi \quad (3),$$

wherein L3 is a belt span between the flat pulley 3 and the drive pulley 1 (a distance between the winding end point c and the winding start point d).

When the belt span L1 between the flat pulley 3 and the driven pulley 2 becomes equal to or smaller than a predetermined value, engagement of the ribs of the V-ribbed belt 10 with the grooves of the driven pulley 2 exerts influence, so that the tension of the V-ribbed belt 10 becomes larger than the frictional force thereof against the outer peripheral face of the flat pulley 3, and accordingly, the V-ribbed belt 10 slips sideways over the outer peripheral face of the flat pulley 3. This results in that: the V-ribbed belt 10 enters not substantially perpendicularly into the plane that includes the axis 3a of rotation of the flat pulley 3 and travels close to the straight line $T_a$ that connects the center (the winding start point d) in the axial direction of the drive pulley 1 and the center (the winding end point a) in the axial direction of the driven pulley 2.

Figure 8:
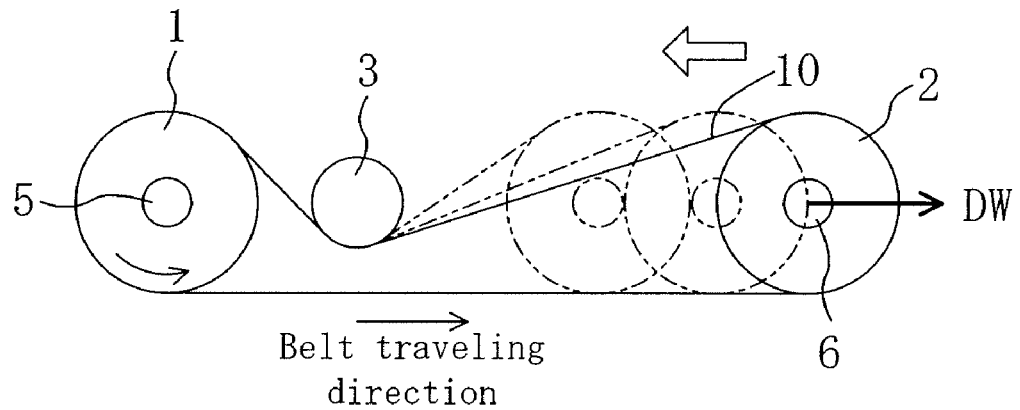
FIG. 8 is a front view showing a schematic construction of the drive system when the belt span between a driven pulley and the flat pulley is changed.
Figure 9:
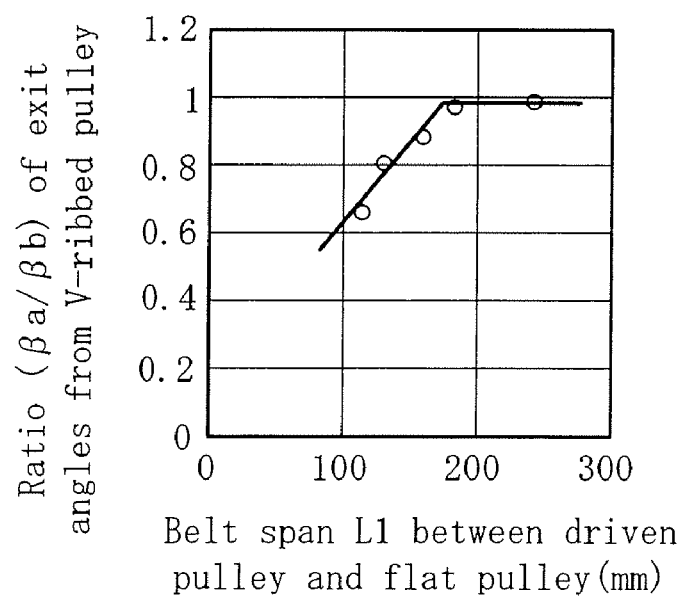
FIG. 9 is a graph showing the relationship between analysis results of the entrance angle of the belt to the flat pulley by the FEM analysis and results of calculation of the expression using the two-dimensional models when the belt span between the driven pulley and the flat pulley is changed.

Specifically, when the belt span L1 between the driven pulley 2 and the flat pulley 3 is changed as shown in FIG. 8, the ratio of an exit angle $\beta_a$ of the belt from the driven pulley 2 calculated in the FEM analysis to a belt exit angle $\beta_b$ (=x) based on the aforementioned two-dimensional models varies as shown in FIG. 9. The results in FIG. 9 are obtained from calculation using the test machine in which the drive pulley 1 and the driven pulley 2 each have a diameter of 145 mm, the flat pulley 3 has a diameter of 70 mm, the belt span between the flat pulley 3 and the drive pulley 1 is 40 mm under the condition that the total length of the belt 10 is changed to 1100, 1200 m and 1300 mm according to changed in the belt span L1 with the load DW=980 N applied to the driven pulley 2 for causing the tension to work on the belt 10.

FIG. 9 shows that in the range of the belt span L1 is equal to or smaller than the predetermined value, the exit angle $\beta_a$ of the belt from the driven pulley 2 calculated in the FEM analysis that simulates the state of the actual test machine becomes smaller as the belt span L1 is reduced while the exit angle $\beta_b$ of the belt from the driven pulley 2 obtained from expression calculation using the two-dimensional models is constant on the assumption that the V-ribbed belt enters at 90 degrees into the plane that includes the axis 3a of rotation of the flat pulley 3. This means that the ratio of the exit angle $\beta_a$ of the belt from the driven pulley 2 calculated in the FEM analysis to the exit angle $\beta_b$ calculated from the two-dimensional models becomes smaller as the belt span L1 becomes smaller.

In other words, it is understood from FIG. 9 that the exit angle $\beta$ of the V-ribbed belt 10 from the driven pulley 2 is smaller when the belt span L1 between the driven pulley 2 and the frat pulley 3 is smaller than the predetermined value (approximately 185 mm in the present embodiment) than that when the belt span L1 is larger than the predetermined value. Namely, the belt 10 enters at the point near the straight lint $T_a$.

When the exit angle $\beta$ of the V-ribbed belt 10 from the driven pulley 2 becomes small, the V-ribbed belt 10 enters into the plane that includes the axis 3a of rotation of the flat pulley 3 at an angle (γ in the drawing) larger than 90 degrees on the straight line $T_a$ side, namely, enters at an entrance angle of the belt to the flat pulley 3 of larger than zero degree. Accordingly, the entrance angle α of the V-ribbed belt 10 to the drive pulley 1 is smaller than that when the belt 10 enters substantially perpendicularly to the plane that includes the axis 3a of rotation of the flat pulley 3. Wherein, only the center line 10b of the V-ribbed belt 10 is indicated in FIG. 7.

For this reason, when the belt span L1 between the driven pulley 2 and the flat pulley 3 is equal to or smaller than the predetermined value, the angle γ of the belt track with respect to the plane that includes the axis 3a of rotation of the flat pulley 3 (an entrance angle of the belt to the flat pulley 3 corresponds to an angle obtained by subtracting 90 degrees from the angle γ), the exit angle $γ_b$ of the belt from the driven pulley 2, and the entrance angle $\alpha_b$ of the belt to the drive pulley 1 are corrected with the use of the following expressions with sideways slip of the V-ribbed belt 10 over the outer peripheral face of the flat pulley 3 taken into consideration.

$$γ = 90 + x(1 - F(L)) \quad (4)$$

$\beta_b$ in the above expression (1) is corrected in the expression (4) to be:

$$\beta_b' = \beta_b * F(L) \quad (5),$$

and the expression (1) and the expression (3) are replaced by the following expressions:

$$y1' = L1*\tan(\beta_b' \pi/180) \quad (6)$$

$$\alpha_b' = \tan^{-1}((y1'+y2)/L1)*180/\pi \quad (7).$$

Herein, x is an inclination of the flat pulley 3, and F(L) is a correction function determined by the kind of a belt, the shape of a pulley, and the like. The correction function F(L) is determined on the basis of the ratio of an actual exit angle β of the belt from the driven pulley 2 (the angle $\beta_a$ estimated on the basis of the tree-dimensional CAD in the present embodiment) to the entrance angle $\beta_b$ obtained on the basis of the two-dimensional models, as shown in FIG. 9.

Specifically, in the present embodiment, the correction function F(L) is 1 when the span L1 is larger than the predetermined value. While when the belt span L1 is equal to or smaller than the predetermined value, 0.0043XL1+1.929 are used as the correction function F(L), which is obtained as an approximate curve where L1 is 185 mm or smaller in FIG. 9.

Namely, x(1−F(L)) in the expression (4) is a correction of the entrance angle of the belt to the flat pulley 3. When the belt span L1 between the flat pulley 3 and the driven pulley 2 is larger than the predetermined value, F(L) becomes 1, and accordingly, the entrance angle of the belt to the flat pulley 3 remains zero. In contrast, when the belt span L1 is equal to or smaller than the predetermined value, the entrance angle of the belt to the flat pulley 3 is corrected so as to be larger as the belt span L1 becomes shorter.

It is noted that in FIG. 5, the entrance angle $\alpha_b$ obtained by the present entrance angle estimation method is obtained through the expression (7) when the belt span L1 between the driven pulley 2 and the flat pulley 3 is equal to or smaller than the predetermined value and is obtained through the expression (3) when the belt span L1 is larger than the predetermined value.

—Pulley Layout Designing Method—

With the above entrance angle estimation method employed, the entrance angle α can be estimated at the stage of pulley layout design, leading to modification to pulley layout in which the entrance angle α is set at an angle at which no noise is generated in belt running. The layout designing method thereof will be described below with reference to the flow of FIG. 10.

Figure 10:
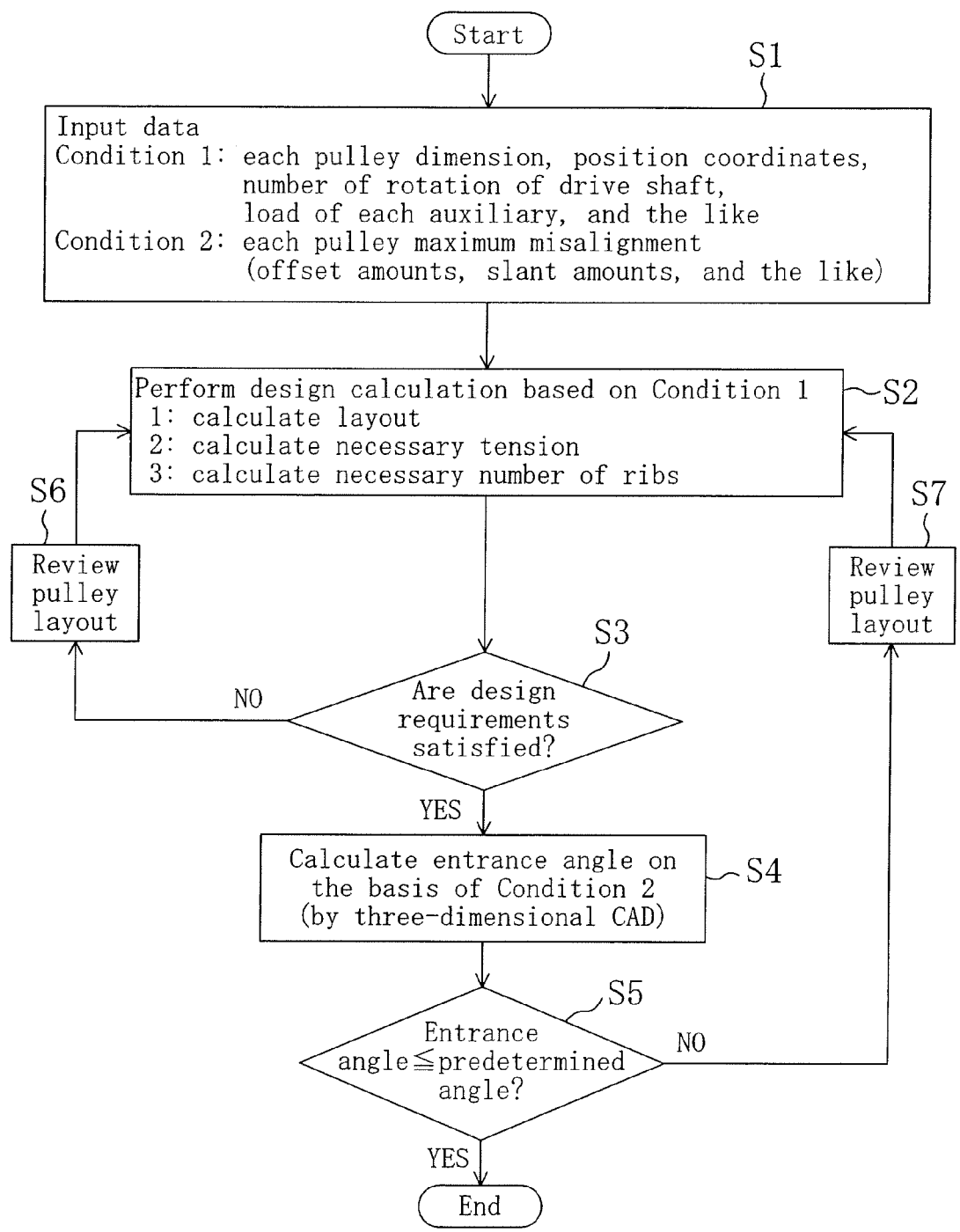
FIG. 10 is a flowchart depicting a pulley layout designing method employing the entrance angle estimation method according to the present invention.
Figure 11:
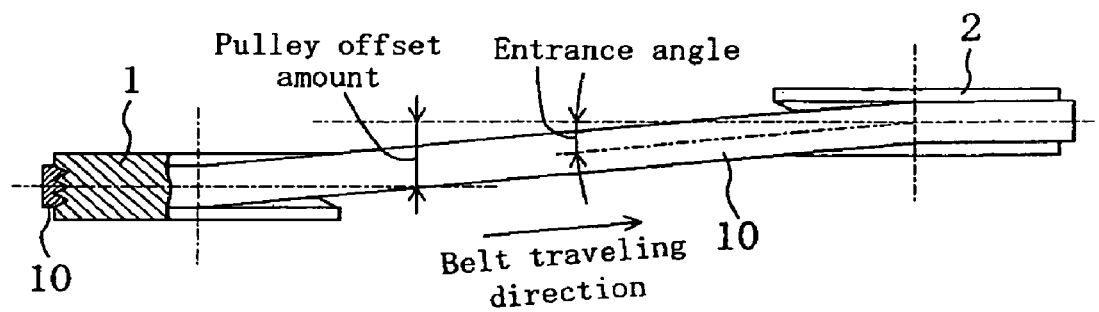
Figure 11:
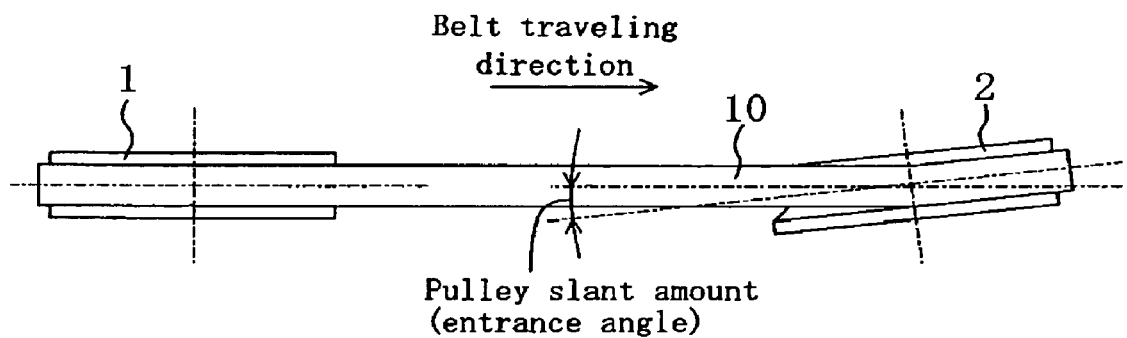

First, when the flow of FIG. 10 starts, various kinds of input data is input in a step S1. The input data is roughly grouped into two kinds of data of: data (condition 1) necessary for design calculation performed in a later step S2, such as the dimensions and the position coordinates of the pulleys, the number of rotation of the drive shaft, load and the like of each auxiliary, and the like; and data (condition 2) necessary for entrance angle calculation performed in a later step S4, such as maximum misalignment (an offset amount, a slant amount, and the like) assumed in each pulley.

Then in the next step S2, design calculation for the drive system T is performed on the basis of the input data of the condition 1 input in the step S1. Specifically, in this design calculation, the layout of each pulley, the tension of the belt, and the number of ribs to be formed on the belt are calculated. Then in a step S3, whether or not the calculation results satisfy predetermined design requirements is judged. When the design requirements are satisfied (YES), the routine proceeds to the step S4. Otherwise, namely, when the design requirements are not satisfied (NO), the routine proceeds to a step S6 for reviewing the pulley layout and design calculation is performed again in the step S2.

Herein, review of the pulley layout in the step S6 means review of the position and the like of each pulley. Review of the position of each pulley leads to satisfaction of the predetermined design requirements regarding the tension and the number of ribs of the V-ribbed belt.

In the step S4 followed when YES in the step S3, the entrance angle α of the belt to the drive pulley 1 is calculated. For calculating the entrance angle α, it is preferable to use a three-dimensional CAD capable of creating three-dimensional models as descried above in view of design efficiency.

After calculation of the entrance angle α in the step S4, whether or not the angle as the calculation result is equal to or smaller than a predetermined angle at which the belt generates no noise in belt running is judged in a next step S5. When the entrance angle α is equal to or smaller than the predetermined angle (YES), which means that it is judged that the current layout design satisfies the design requirements and the requirement of the entrance angle, the flow is ended. The angle at which the belt generates no noise in belt running (the predetermined angle) is in the range between 0.5 and 1.0 degree in general.

In contrast, when it is judged that the entrance angle α is larger than the predetermined angle (NO) in the step S5, the routine proceeds to a step S7 for reviewing the position of each pulley and calculation and judgment in the step S2 through S5 are repeated so that the entrance angle α becomes equal to or smaller than the predetermined angle in the step S5.

Change in pulley position in the step S7 modifies mainly the positions of the flat pulley 3 and the driven pulley 2. When the pulley layout is changed by increasing the belt span between the flat pulley 3 and the drive pulley 1 and/or by reducing the belt span between the driven pulley 2 and the flat pulley 3, the entrance angle α of the belt to the drive pulley 1 can be reduced. Specifically, in the case where the V-ribbed belt 10 passes substantially the same point on the flat pulley in the widthwise direction, an increase in the belt span between the flat pulley 3 and the drive pulley 1 reduces the entrance angle α of the belt to the drive pulley 1 relatively. As well, reduction in the belt span between the flat pulley 3 and the driven pulley 2 makes the V-ribbed belt 10 to enter into the flat pulley 3 along a line more close to the straight line $T_a$ (see FIG. 2), resulting in relative reduction in entrance angle α of the belt to the drive pulley 1.

Herein, the step S4 of calculating the entrance angle α corresponds to an entrance angle estimation step, and the step S7 of reviewing the pulley layout when the entrance angle α is larger than the predetermined angle corresponds to a layout changing step.

It is noted that when the results of design calculation do not satisfy the design requirements in the step S3 or the entrance angle is larger than the predetermined angle in the step S5, only notification (or display) that the requirement(s) is/are not satisfied may be performed rather than returning to the step S2 for performing design calculation. This allows the operator to grasp quickly whether or not the results of design calculation satisfy the predetermined design requirements and whether or not the entrance angle falls in the predetermined range.

As described above, in the present embodiment, the entrance angle α of the belt to the drive pulley 1 is estimated geometrically on the basis of the finding that the V-ribbed belt 10 wound to a V-ribbed pulley 1 as the drive pulley, a V-ribbed pulley 2 as the driven pulley, and the flat pulley 3 arranged therebetween forms a track which enters at an entrance angle of the belt to the flat pulley 3 of approximately zero degree, namely, enters substantially perpendicularly to the plane that includes the axis 3a of rotation, which is wound along the outer periphery of the flat pulley 3 without deviating in the axial direction thereof, and extends linearly toward the drive pulley 1 on the exit side thereof. Hence, pulley layout can be designed at the stage of pulley layout design with the entrance angle α of the V-ribbed belt 10 to the drive pulley 1 taken into consideration, thereby obviating noise generation in belt running.

Further, the entrance angle α can be obtained easily by the three-dimensional CAD without involving complicated calculation on paper, leading to easy pulley layout design with the entrance angle taken into consideration.

Other Embodiments

The constitution of the present invention is not limited to the above embodiment and the present invention includes various constitutions other than that. Specifically, the drive system T in which one flat pulley 3 is arranged between the drive pulley 1 and the driven pulley 2 is used in the above embodiment, but the arrangement is not limited thereto and may be such that a plurality of flat pulleys 3, 3 . . . are arranged between the drive pulley 1 and the driven pulley 2. In this case, similarly to the case with only one flat pulley 3, the V-ribbed belt 10 forms a track with respect to the flat pulleys 3 which enters substantially perpendicular to the planes (or segments parallel to the respective axes 3a of rotation) that include the axes 3a of rotation of the flat pulleys 3, which is wound along the outer peripheries of the flat pulleys 3, and extends substantially linearly toward the drive pulley 1.

Although the entrance angle α of the V-ribbed belt 10 to the drive pulley 1 is obtained in the above embodiment, the present invention is not limited thereto and the entrance angle of the belt to the driven pulley 2 may be obtained.

Furthermore, the belt drive system T is modeled on the three-dimensional CAD for obtaining the entrance angle α of the belt to the drive pulley 1 on the three-dimensional CAD in the above embodiment, but the present invention is not limited thereto and the entrance angle α may be obtained by, for example, executing an expression calculating program which outputs only a numerical calculation result from numerical data, such as each pulley position, maximum misalignment of the flat pulley 3, and the like.

In addition, the entrance angle α is calculated on the assumption that, for example, as shown in FIG. 2, the V-ribbed belt 10 is bent in the widthwise direction of the belt at the winding start point d and the winding end points a, c at the respective pulleys 1, 2, 3 in the above embodiment, but the present invention is not limited thereto and the V-ribbed belt 10 may be bent in an arc shape in the widthwise direction with the rigidity in the widthwise direction of the belt 10 taken into consideration. In the case where the V-ribbed belt 10 is bent in an ark shape, it is, of course, necessary to take the arc sharp into consideration in expression calculation and calculation in the three-dimensional CAD.

The invention claimed is:

1. A method for estimating an entrance angle of a V-ribbed belt from a flat pulley to a V-ribbed pulley when at least one of three pulleys includes misalignment in a belt transmission device in which the V-ribbed belt has an inner peripheral face including a plurality of ribs thereon and is wound to at least two V-ribbed pulleys having an outer peripheral face including a plurality of grooves thereon such that the ribs of the V-ribbed belt are engaged with the grooves of the V-ribbed pulleys, and at least one flat pulley arranged between the V-ribbed pulleys having an outer peripheral face formed to be flat, and an outer peripheral face of the V-ribbed belt on which no rib is formed is in contact with the outer peripheral face of the flat pulley, comprising the steps of:

obtaining, on the assumption that, due to friction between the outer peripheral face of the V-ribbed belt and the outer peripheral face of the flat pulley, the V-ribbed belt forms a track: which enters linearly at an entrance angle of zero degrees into the flat pulley from one of the pulleys which is located on the entry side of the flat pulley; which is wound on the outer peripheral face of the flat pulley without deviating in the widthwise direction thereof; and which travels linearly to the other pulley on the exit side of the flat pulley from the flat pulley, the track of the V-ribbed belt; and estimating an entrance angle of a belt from the flat pulley to the V-ribbed pulley on the basis of a mathematical relationship between the entrance angle and an angle of inclination formed by an axis of rotation of the flat pulley and an axis of rotation of the V-ribbed pulley.

2. The method for estimating an entrance angle of claim 1, further comprising the step of:

correcting, when a belt span between the flat pulley and the V-ribbed pulley located on the belt entry side thereof is equal to or smaller than a predetermined value, the entrance angle of the V-ribbed belt to the flat pulley so as to be larger than zero degrees.

3. The method for estimating an entrance angle of claim 1 further including a layout changing step of changing, when the entrance angle estimated in the entrance angle estimation step is larger than a predetermined angle, pulley layout so as to increase a belt span between the V-ribbed pulley and the flat pulley and/or so as to reduce a belt span between the flat pulley and the V-ribbed pulley located on the belt entry side thereof.

4. The method for estimating an entrance angle of claim 2 further including a layout changing step of changing, when the entrance angle estimated in the entrance angle estimation step is larger than a predetermined angle, pulley layout so as to increase a belt span between the V-ribbed pulley and the flat pulley and/or so as to reduce a belt span between the flat pulley and the V-ribbed pulley located on the belt entry side thereof.

5. A method for estimating an entrance angle of a V-ribbed belt from a flat pulley to a V-ribbed pulley in a belt transmission device in which the V-ribbed belt is wound around at least two V-ribbed pulleys, and at least one flat pulley is arranged between the V-ribbed pulleys having an outer peripheral face formed to be flat that engages an outer peripheral face of the V-ribbed belt on which no rib is formed, comprising the steps of:

obtaining a track of the V-ribbed belt in the belt transmission device due to friction between the outer peripheral face of the V-ribbed belt and the outer peripheral face of the flat pulley in which the belt enters linearly at an entrance angle of zero degrees into the flat pulley from one of the V-ribbed pulleys which is located on the entry side of the flat pulley; the belt engaging the outer peripheral face of the flat pulley without deviating in the widthwise direction thereof; and the belt traveling linearly to the other V-ribbed pulley on the exit side of the flat pulley, and estimating an entrance angle of a belt from the flat pulley to the V-ribbed pulley on the basis of a mathematical relationship between the entrance angle and an angle of inclination formed by an axis of rotation of the flat pulley and an axis of rotation of the V-ribbed pulley.

\* \* \* \* \*